(12) United States Patent  
Gale et al.

(10) Patent No.: US 8,676,623 B2  
(45) Date of Patent: Mar. 18, 2014

(54) BUILDING DIRECTORY AIDED NAVIGATION

(75) Inventors: William N. Gale, Oak Park, IL (US); Joseph P. Mays, Chicago, IL (US)

(73) Assignee: Navteq B.V., Veldhoven (NL)

( * ) Notice: Subject to any disclaimer, the term of this patent is extended or adjusted under 35 U.S.C. 154(b) by 605 days.

(21) Appl. No.: 12/927,601

(22) Filed: Nov. 18, 2010

(65) Prior Publication Data

US 2012/0130762 A1 May 24, 2012

(51) Int. Cl.  
*G01C 21/00* (2006.01)

(52) U.S. Cl.  
USPC ........................................................ 705/7.13

(58) Field of Classification Search  
USPC ........................................................ 705/7.13  
See application file for complete search history.

(56) References Cited

U.S. PATENT DOCUMENTS

| | | | | |
|---|---|---|---|---|
| 7,962,128 B2 * | 6/2011 | Neven et al. | ................ | 455/414.3 |
| 8,302,030 B2 * | 10/2012 | Soroca et al. | ................ | 715/810 |
| 2003/0080978 A1 * | 5/2003 | Navab et al. | ................ | 345/633 |
| 2005/0164725 A1 * | 7/2005 | Naito et al. | ................ | 455/517 |
| 2007/0106721 A1 * | 5/2007 | Schloter | ................ | 709/200 |
| 2008/0114564 A1 * | 5/2008 | Ihara | ................ | 702/158 |
| 2008/0163379 A1 * | 7/2008 | Robinson et al. | ................ | 726/27 |
| 2008/0214210 A1 * | 9/2008 | Rasanen et al. | ................ | 455/456.3 |
| 2008/0226130 A1 | 9/2008 | Kansal et al. | ................ | 382/106 |
| 2008/0267504 A1 * | 10/2008 | Schloter et al. | ................ | 382/181 |
| 2008/0268876 A1 * | 10/2008 | Gelfand et al. | ................ | 455/457 |
| 2009/0163228 A1 | 6/2009 | Blumberg et al. | ................ | 455/456.3 |
| 2010/0021012 A1 | 1/2010 | Seegers et al. | ................ | 382/113 |
| 2010/0021013 A1 | 1/2010 | Gale et al. | ................ | 382/113 |
| 2010/0023249 A1 | 1/2010 | Mays et al. | ................ | 701/200 |
| 2010/0023250 A1 | 1/2010 | Mays et al. | ................ | 701/201 |
| 2010/0023251 A1 | 1/2010 | Gale et al. | ................ | 701/201 |
| 2010/0023252 A1 | 1/2010 | Mays et al. | ................ | 701/201 |
| 2011/0244919 A1 * | 10/2011 | Aller et al. | ................ | 455/556.1 |

OTHER PUBLICATIONS

European Search Report, EPA 11189564.5, dated Feb. 13, 2012.

* cited by examiner

*Primary Examiner* — Thomas Tarcza  
*Assistant Examiner* — Alex C Dunn  
(74) *Attorney, Agent, or Firm* — Lempia Summerfield Katz LLC (57) ABSTRACT

A navigation system utilizes building directories to aid navigation. A mobile device, such as a mobile phone, captures an image of a building directory. The building directory includes information regarding the names and/or locations of tenants. An image recognition algorithm is performed on the captured image to extract information from the building directory. The extracted information is used to access a map database. The mobile device may display directions or a map to guide the user to a selected destination. In addition, the captured image may be used to build the map database or update the map database. Finally, the captured image may be matched with stored images of the building directory to determine the current location of the mobile device.

27 Claims, 11 Drawing Sheets

ERROR REPORT

| Geographic Position | Location Name | Index | Timestamp | New/Change | Conf. Score |
|---|---|---|---|---|---|
| X1, Y1 | Beta and Co. | 1A | 01.01.2010 24:00 | Change | 1.5 |

ERROR REPORT

| Geographic Position | Location Name | Index | User ID | Count |
|---|---|---|---|---|
| X1, Y1 | Beta and Co. | 1A | 312-555-1234 | 1 |
| X1, Y1 | Beta and Co. | 1A | 312-555-1235 | 2 |

BUILDING DIRECTORY AIDED NAVIGATION

BACKGROUND

The present embodiments generally relate to navigation related to a building.

Navigation systems or devices provide useful features, including the identification of routes to destinations or points of interests. The navigation system can determine the optimum route to be taken by the end user to travel from the origin to the destination location from map data. Navigation systems often use global positioning system (GPS), which may suffer from decreased performance in indoor environments or in dense urban areas with high buildings.

In addition, updating and checking geographic data may involve significant difficulty, especially in indoor environments. Therefore, providing up-to-date and accurate data, for use in navigation systems is a continuing effort.

SUMMARY

A mobile device is used to interact with a building directory. A captured image of the building directory is received. The image includes a plurality of location values. An image recognition algorithm is executed on the captured image of the building directory. At least one of the location values is identified based on an output of the image recognition algorithm. A map database is accessed according to the at least one location value. The map database may return navigation directions to the mobile device for the purpose of guiding a user to a particular geographic location described by the building directory. The map database may be updated according to the captured image when the building directory includes information not already stored in the map database. The captured image of the building directory may be matched with previously stored images of the building directory in order to determine the current geographic position of the mobile device.

The present invention is defined by the following claims, and nothing in this section should be taken as a limitation on those claims. Further aspects and advantages of the invention are discussed below in conjunction with the preferred embodiments.

DETAILED DESCRIPTION

Navigation systems may be configured to utilize building directories in a variety of implementations. In one implementation, building directories may be used to perform destination selection in indoor navigation applications. In another implementation, building directories may be used to update indoor maps either automatically through user captured images or to initiate the dispatching of personnel to the indoor location. In another implementation, building directories may be used to determine a user's position by matching a captured image of a building directory to an entry in a database. The database may include known building directories and respective locations or the database may include combinations of tenants found on the captured image of the building directory. Any one or a combination of these implementations may be embodied in a navigation system.

Figure 1:
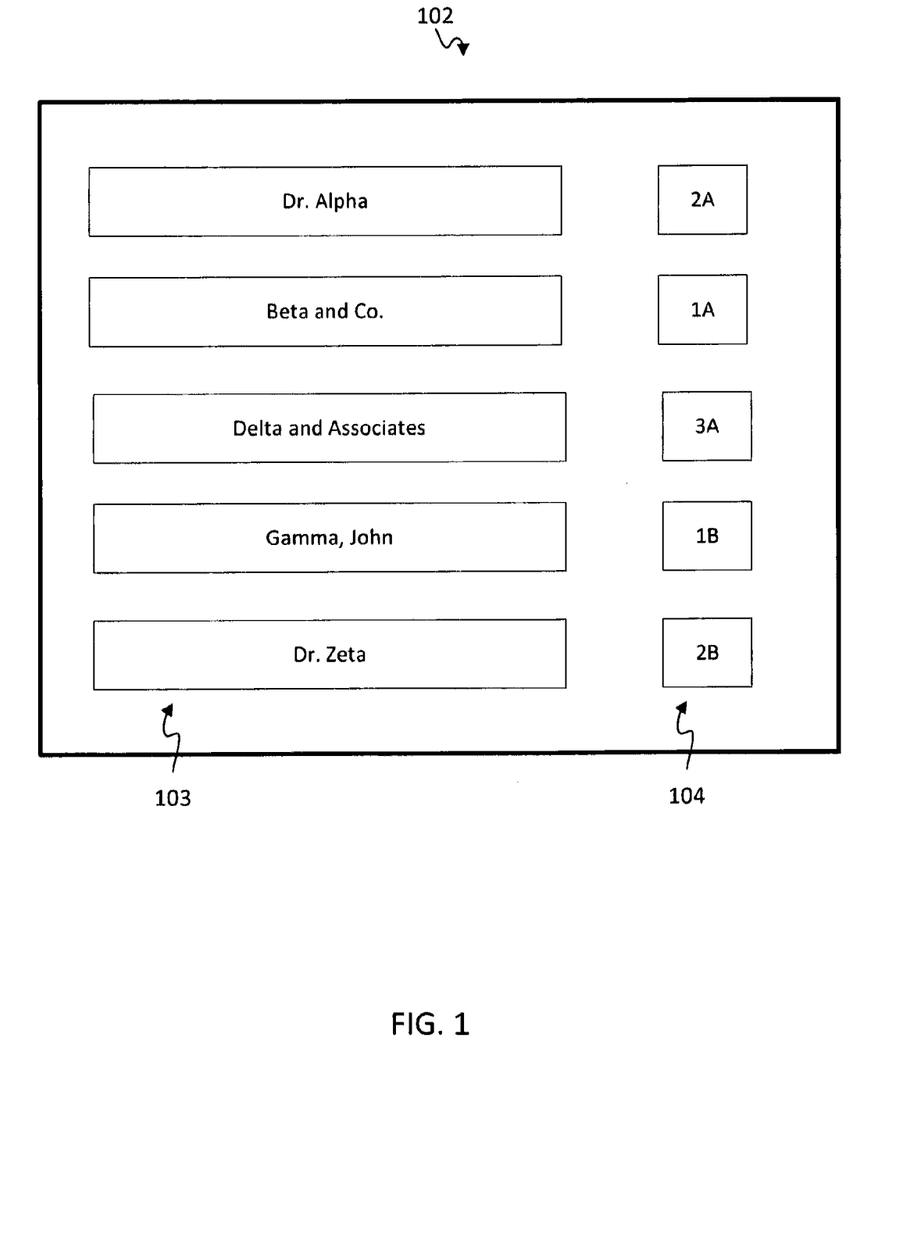
FIG. 1 illustrates an example building directory.

FIG. 1 illustrates an example building directory 102. The building directory 102 includes at least one location value, which may be a location name 103 or a location index 104. The building directory 102 may also or alternatively include graphical logos or additional information. The location index may be a suite number, floor number, or other location cross-reference information. The building directory 102 may be organized alphabetically, by location, by category, or randomly. The building directory 102 matches location names 103 with respective location indexes 104 but may not provide any information of the actual locations within the indoor environment (e.g., may not provide a map). The indoor environment may be a convention center, an airport, a shopping mall, an office building, or another type of building.

Figure 2:
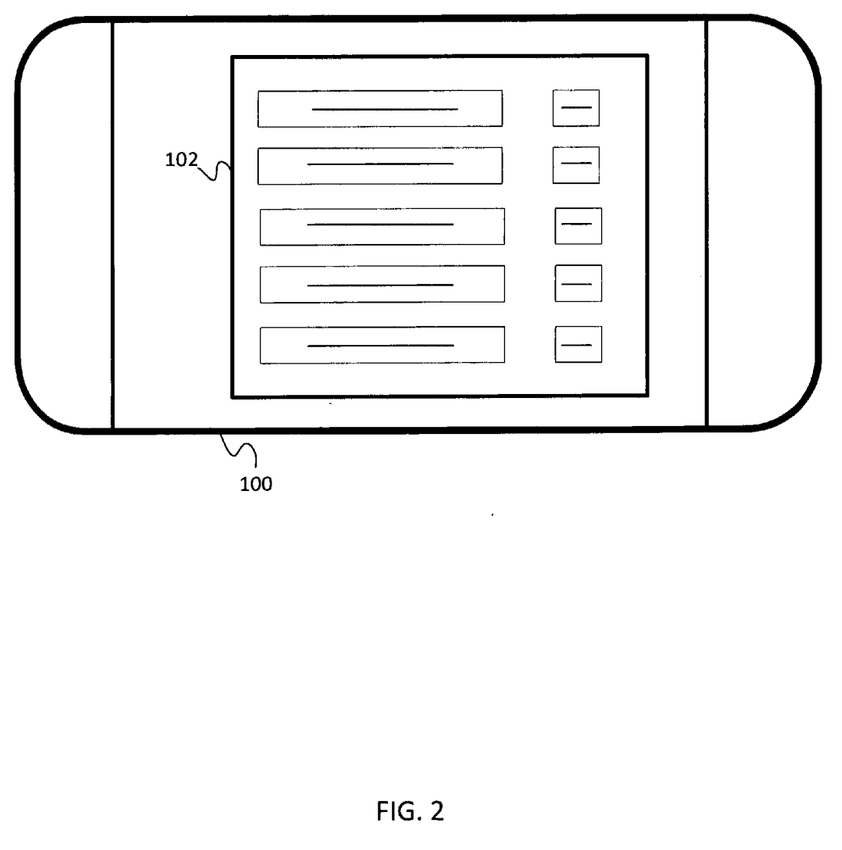
FIG. 2 illustrates a mobile device viewing the building directory of FIG. 1.

FIG. 2 illustrates a mobile device 100 imaging the building directory 102 of FIG. 1. A user may point the mobile device 100 at the building directory 102 in order to capture an image of all or part of the building directory 102. The building directory 102 may be on a wall, such as in the lobby of a building, or printed on a paper or brochure. The building directory 102 may be displayed on a screen (user interface). The screen may be mounted on a wall or accessed through a personal computer. In any case, the mobile device 100 runs a viewing application configured to capture an image of the building directory 102. A viewing application is any application that utilizes a camera, such as a camera or video function. The viewing application may be an augmented reality application, as discussed in detail below.

Figure 3:
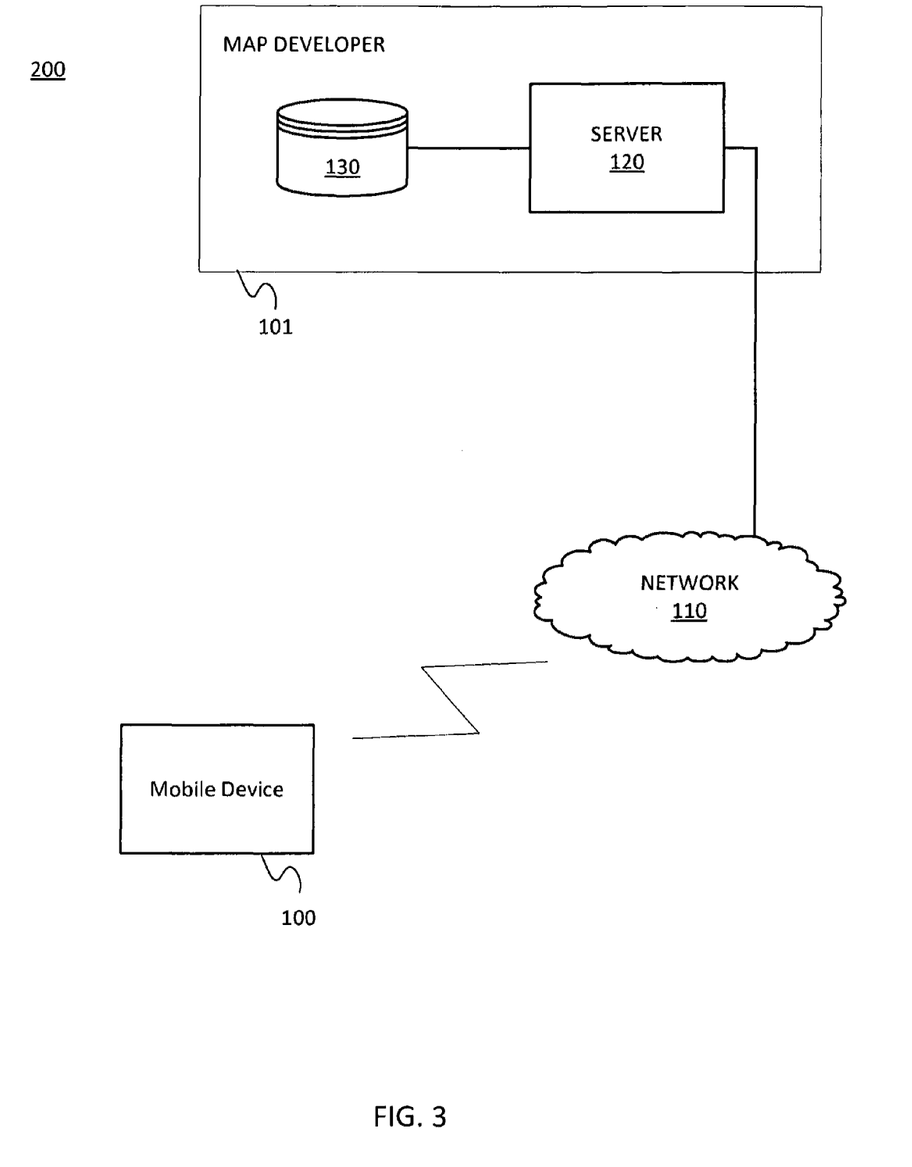
FIG. 3 illustrates a navigation system including a mobile device and a map developer.

FIG. 3 illustrates a navigation system 200 including the mobile device 100 and a map developer 101 in communication with a network 110. The navigation system 200 interacts with building directories. The mobile device 100 may directly interact with the building directory 102 to provide navigation instruction to a user. The mobile device 100 may provide the captured image to the map developer 101 to update a map database or determine a user's location based on information found in the map directory 102. Additional, different, or fewer components may be provided, such as additional mobile devices 100, different networks 110, and/or other map developers 101.

In one example use of the navigation system 200, the mobile device 100 captures an image of the building directory 102. The map developer 101 receives the captured image of the building directory 102 from the mobile device 100. The map developer 101 executes an image recognition algorithm on the captured image of the building directory 102 to identify a location name or a location index that appears on the building directory 102. The image recognition algorithm may include optical character recognition (OCR).

The map developer 101 accesses a map database according to the location name or location index. In one implementation, navigation data may be provided to the mobile device 100 based on a selection received from a user. In another implementation, entries in the map database may be compared with location names or location indexes from the building directory 102 to update the map database when locations are new, moved, or reconfigured. In another implementation, the map developer 101 may provide a geographic position to the mobile device 101 by matching the captured image to a known building directory image.

The mobile device 100 may be a cellular telephone, a mobile phone, a smart phone, a personal digital assistant ("PDA"), a camera, a tablet computer, a laptop, a personal navigation device ("PND"), a portable navigation device, and/or any other electronic device capable of capturing an image. The mobile device 100 includes a network interface for wirelessly or wired connection to the network 110.

The map developer 101 includes at least the map database 130 and the server 120. The map database 130 includes map data used for navigation-related services. The map data may be associated with indoor locations. The map data may include segment and node information. Other formats may be used for the map data. The map database 130 may include image-related information, such as features extracted from previously captured images or previously recognized images, that may be matched with features of the captured image of the building directory 102 based on location, orientation, and scale.

The map database 130 may be produced and/or maintained by map developer 101, such as NAVTEQ North America, LLC located in Chicago, Ill. In other embodiments, the developer 101 includes navigation information related to a building, but not necessarily map information. For example, the developer 101 includes a database 130 of building directories.

The network 110 and the communication paths between the map developer 101 and the network 110 may be any protocol or physical connection that is used to couple a server to the mobile device 100. The communication paths may utilize cellular (e.g. 3G, 4G, or WiMAX), Ethernet, wireless, or any Internet protocol technologies. Alternatively, the network 110 may be a private network that may not be connected to the Internet, a peer to peer network, or an ad-hoc network, such as a mobile mesh network including mobile devices and wireless links. In other embodiments, the mobile device 100 is connected through a wire, such as USB cable, to the network 110. For example, the captured image of the building directory 102 is stored in the mobile device 100 and downloaded to the network 110 once the mobile device 100 connects using a wired or wireless path to the network 110.

Figure 4:
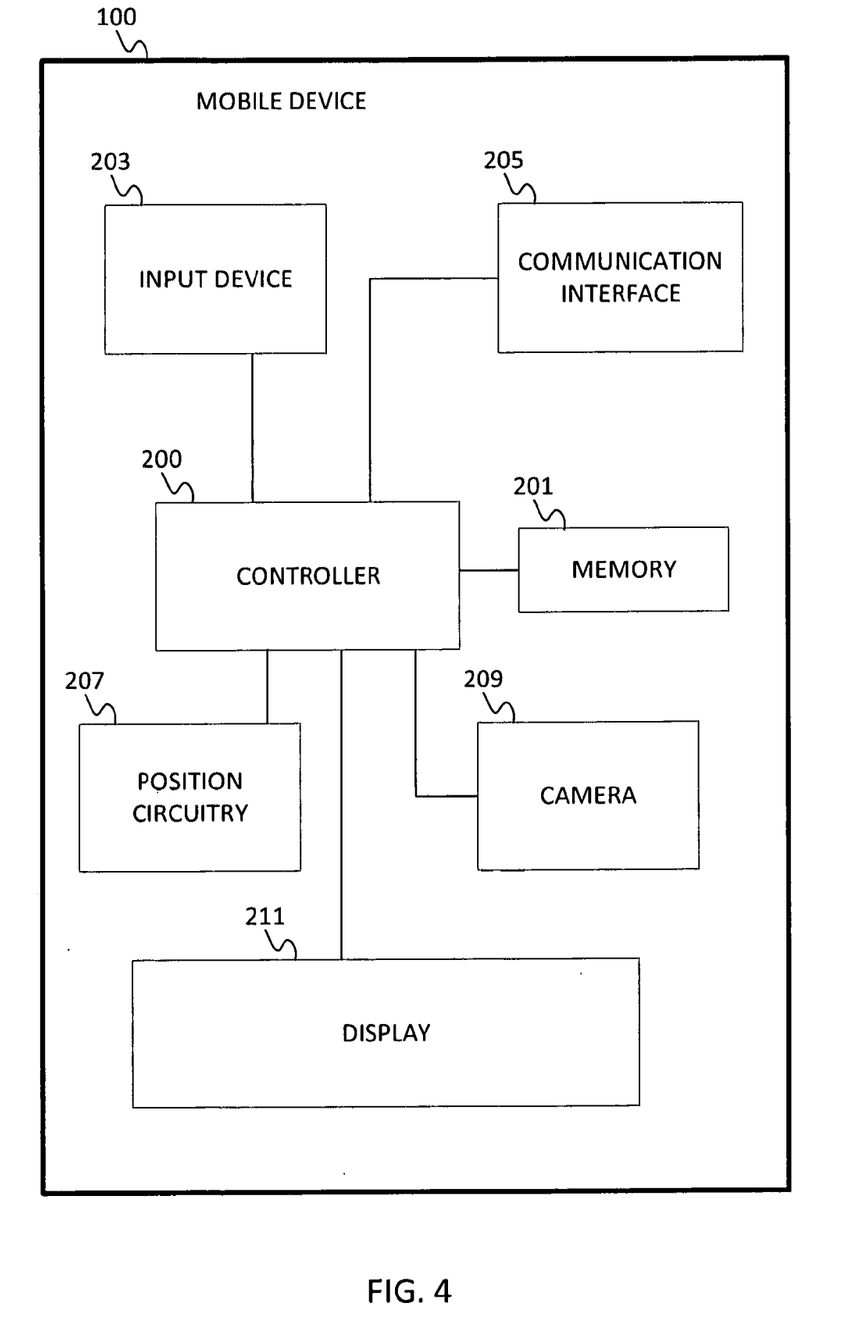
FIG. 4 illustrates a block diagram of the mobile device of FIG. 3.

FIG. 4 illustrates a block diagram of the mobile device 100 of FIG. 3. The mobile device 100 includes a controller 200, a memory 201, an input device 203, a communication interface 205, position circuitry 207, a camera 209, and a display 211. Additional, different, or fewer components may be provided.

The controller 200 may include a general processor, digital signal processor, an application specific integrated circuit (ASIC), field programmable gate array, analog circuit, digital circuit, combinations thereof, or other now known or later developed processor. The controller 200 may be a single device or combinations of devices, such as associated with a network, distributed processing, or cloud computing.

The memory 201 may be a volatile memory or a non-volatile memory. The memory 201 may include one or more of a read only memory (ROM), random access memory (RAM), a flash memory, an electronic erasable program read only memory (EEPROM), or other type of memory. The memory 201 may be removable from the mobile device 100, such as a secure digital (SD) memory card.

The input device 203 may be one or more buttons, keypad, keyboard, mouse, stylist pen, trackball, rocker switch, touch pad, voice recognition circuit, or other device or component for inputting data to the mobile device 100. The input device 203 and the display 211 may be combined as a touch screen, which may be capacitive or resistive. The display 211 may be a liquid crystal display (LCD) panel, light emitting diode (LED) screen, thin film transistor screen, or another type of display.

The communication interface 205 may include any operable connection. An operable connection may be one in which signals, physical communications, and/or logical communications may be sent and/or received. An operable connection may include a physical interface, an electrical interface, and/or a data interface. The communication interface 205 provides for wireless and/or wired communications in any now known or later developed format.

The position circuitry 207 may include one or more of a variety of location algorithms. The Global Positioning System (GPS) is a satellite based system that provides reliable and accurate positioning but has limitations in indoor environments. However, GPS may be combined with or replaced by other location algorithms to provide accurate indoor positioning. Cellular or other positioning systems may be used as an alternative to GPS. Other global navigation satellite systems such as the Russian GLONASS or European Galileo may be used. In some implementations, the position circuitry 207 may be omitted.

One example of a location algorithm is triangulation. In triangulation, the position circuitry 207 includes a signal strength sensor or an array of signal strength sensors configured to measure the signal level from two or more antenna. The controller 200 calculates the position of the mobile device 100 from the signal strength measurements. Triangulation may be used in cellular networks, Bluetooth, or in wireless LAN and wireless mesh, as described in the IEEE 802.11 family of standards.

In addition or in the alternative to a signal strength sensor, the position circuitry 207 may include a timer configured to measure the time necessary for a response from the network. The controller 200 may estimate the position of the mobile device from the change in response times or by comparing response times from a plurality of antenna or access points.

Another example of a location algorithm is proximity detection. A plurality of antenna are configured into a grid or other pattern. The position circuitry 207 detects the closest antenna and controller 200 estimates the location of the mobile device 100. Proximity detection is limited by the density of the pattern of antenna. However, inexpensive technologies such as radio frequency identification (RFID) are suited for dense grids of antenna.

The position circuitry 207 may also include relative position sensors in an inertial position system or dead reckoning system. Relative positions sensors include but are not limited to magnetic sensors (e.g., magnetometers, compasses), accelerometers, gyroscopes, and altimeters. Magnetic sensors determine the direction and or strength of a magnetic field and can be used to determine heading or orientation. Inertial sensors such as accelerometers and gyroscopes measure acceleration, which can be used to calculate position, orientation, and velocity (direction and speed of movement) of the mobile device 100. An altimeter is a pressure used to determine the relative altitude of the mobile device 100, which may be used to determine the vertical location of the mobile device within a building.

The camera 209 may be configured to capture still and/or video images. The camera 209 includes, but is not limited to, a lens and circuitry for taking pictures. Additional, fewer, or different components may be provided. For example, a flash or flash circuitry may be provided. The camera 209 may be positioned so that the lens is facing away from the display 211 or is facing the same direction as the display 211. Alternatively, the camera 209 may be positioned in or configured to move in and face any number of directions.

An augmented reality application may be stored in the memory 201 and executed by the controller 200. The augmented reality application enhances a user's view of the real world with virtual content. The virtual content is displayed in a layer above the real world content, which is captured by the camera 209. The virtual content provides information regarding the real world content. The virtual content may include hyperlinks to additional information regarding the business. Other examples of the virtual information include phone numbers, hours of operation, menus, prices, reviews, and other information.

The augmented reality application is an example of a viewing application. A viewing application is any program that enables the mobile device to receive image data. The simplest viewing application is a camera application. When a picture is taken, the camera 209 captures image data. Even when the camera 209 is not taking a picture, image data may be captured or analyzed as the mobile device 100 is panned around to display an image of a real world scene on the display 211.

In one example, both a front-facing camera and an away-facing camera may be used. The away-facing camera may used with the viewing application discussed above, while the front-facing camera is associated with an eye gaze application running on controller 200. The front-facing camera captures an image of the user and the eye gaze application determines the direction of the user's vision. As discussed below, the direction of the user's vision may be used to determine a selection from the user. In this example, the front-facing camera is included as part of input device 203.

The viewing application may be compatible with a Windows operating system, a Symbian operating system, an Android operating system, iOS, and/or other operating systems. Examples of augmented reality applications include Wikitude, Layar Reality Browser, Cyclopedia, and Nearest Places.

Alternatively, the mobile device 100 may capture image data using light detection and ranging ("LIDAR"), which may also be referred to as 3D laser scanning, uses one or more lasers to collect data points representing a surrounding area. The LIDAR device collects and gathers data points in a point cloud, such as a 3D point cloud, in which each data point corresponds to a local coordinate, such as (x, y, z), and is either on or off, or specifies an intensity. The one or more lasers may be in a near infrared spectrum (such as about 700 nm to about 5000 nm or about 800 nm to about 2500 nm) or other light spectrum. The 3D point cloud is an example of a captured image. The 3D point cloud of the building directory may be analyzed similarly to the other types of captured images using the algorithms discussed below. In another example, other technologies such as magnetic resonance imaging ("MRI") may be used to capture image data.

Figure 5:
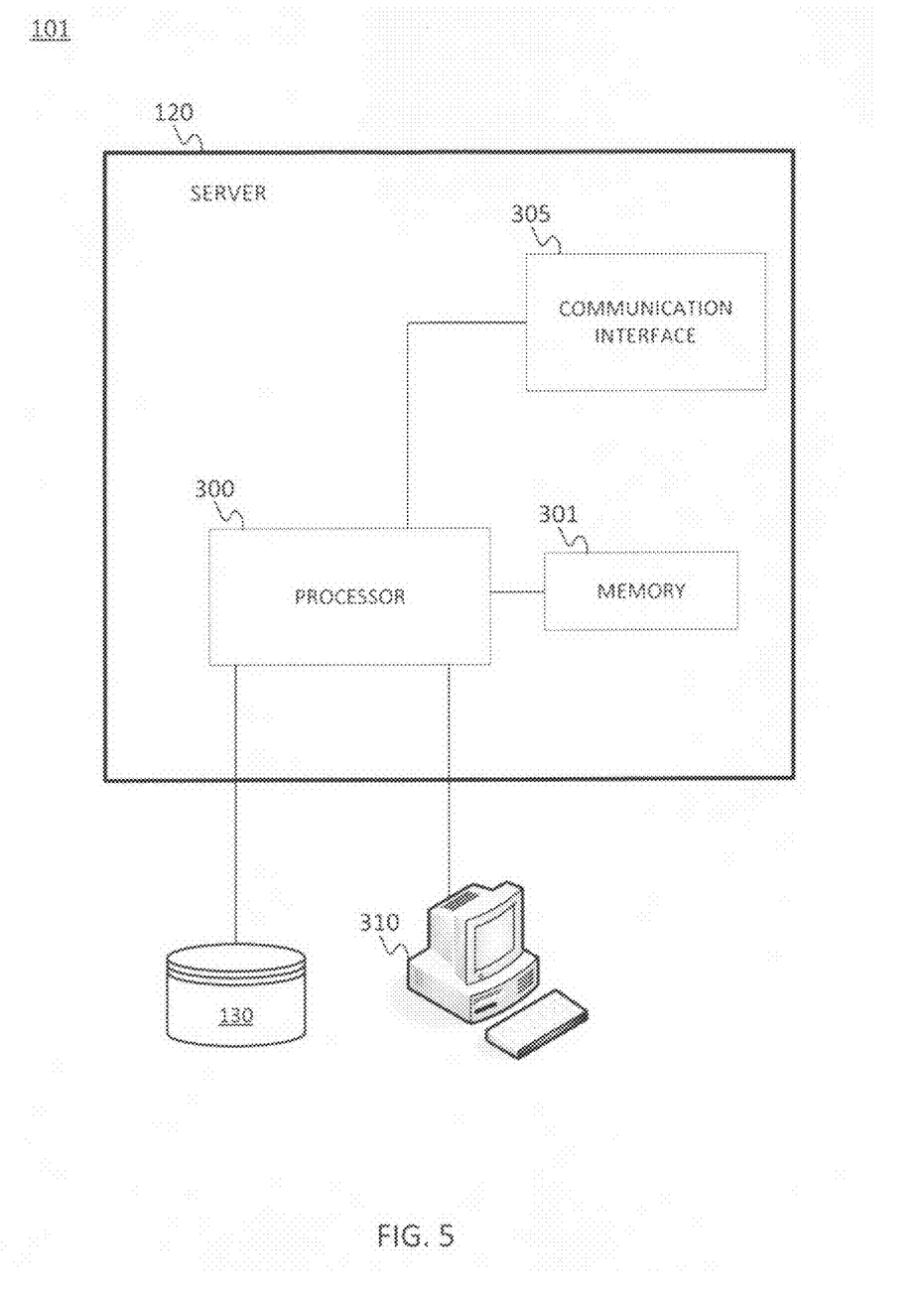
FIG. 5 illustrates a block diagram of the map developer of FIG. 3.

FIG. 5 illustrates a block diagram of the map developer 101 of FIG. 3. In addition to the map database 130 and the server 120, the map developer 101 may include a workstation 310. The server 120 may include a processor 300, a memory 301, and a communication interface 305. Additional, different, or fewer components may be used.

The geographic database 130 may be a memory, hard drive, flash drive, or any storage device. Further, various implementations of the processor 300, the memory 301, and the communication interface 305 may be made in the manner discussed above with respect to the controller 200, the memory 201, and the communication interface 205, respectively.

The navigation system of FIG. 3 may be used in various embodiments. Example uses include map updates, destination selection, and error correction.

Destination Selection

Figure 6A:
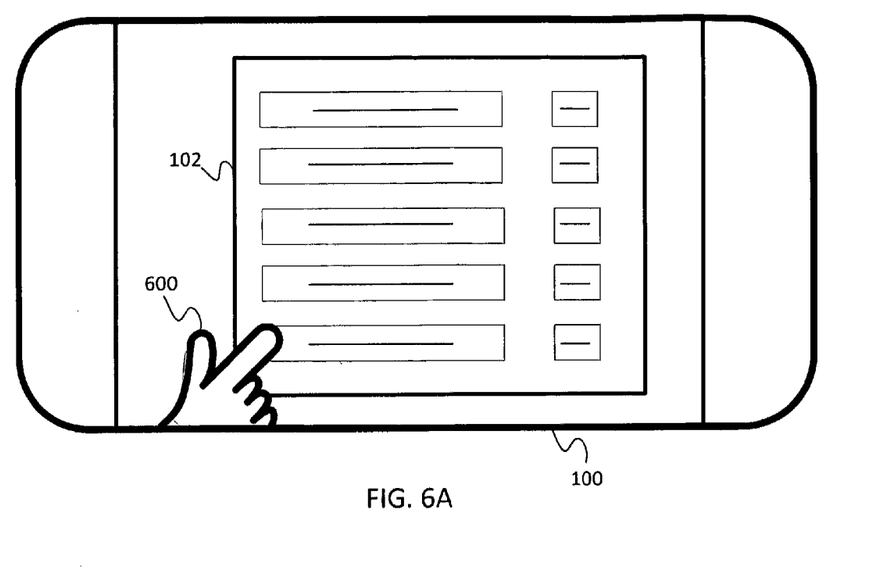
FIG. 6A illustrates a first example of a navigation selection made using the mobile device.

FIG. 6A illustrates a first example of a navigation selection made using the mobile device 100. A user approaches the building directory 102 and positions the mobile device 100 such that camera 209 captures an image of the building directory 102. In the implementation shown in FIG. 6A, the user extends a hand 600 or other pointing device into the frame of the image of the camera 209. The controller 200 may run a tracking algorithm that tracks the location of the hand 600 or finger. Alternatively, the processor 300 identifies the location of the hand 600 or finger.

The controller 200 determines when a selection has been made by the user, such as determining that the hand not moving a specified distance for a predetermined time period or the user "taking" the picture through a user input. The time period may be configurable (e.g., 200 ms, 500 ms, 1 sec.). The specified distance may be measured in pixels (e.g., 50 pixels) or a percentage of the display (e.g., 10%).

Figure 6B:
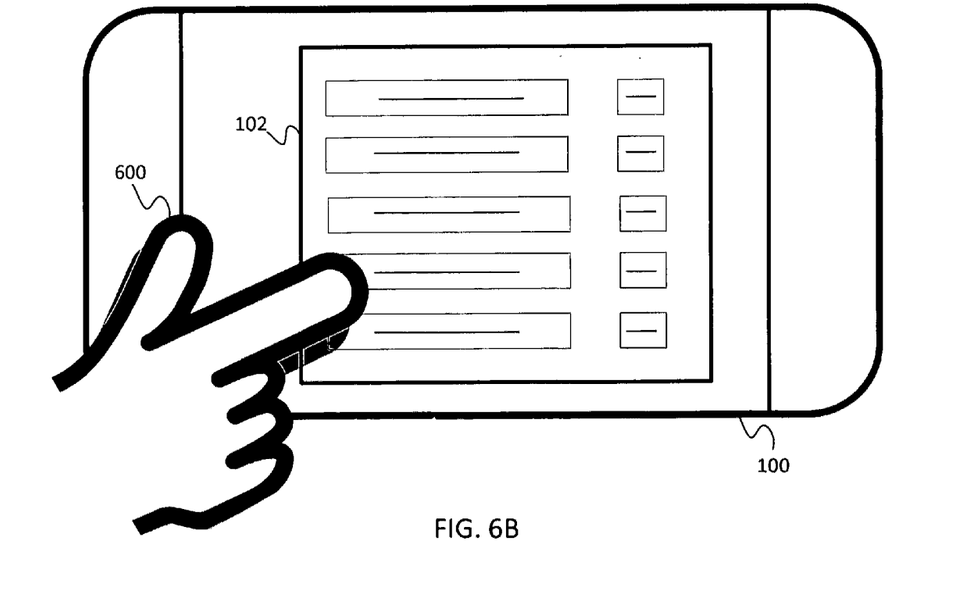
FIG. 6B illustrates a second example of a navigation selection made using the mobile device.

In the implementation shown in FIG. 6B, the user selects a location using a touch screen or another input. The mobile device may be configured to accept either type of input. Alternatively, the navigation selection may be made by the user by extending the zoom of the viewing application substantially around or focused on a location value. Additionally, an augmented reality device, such as glass with an overlaid display, may be used to make the navigation selection using an eye gaze detector.

The location may be identified as a location name 103 or location index 104. The controller 200 or processor 300 may run an OCR application for determining the location name 103 or location index 104. The output of the OCR application may be sent to the map developer 101 to query the map database 130. In addition or alternatively, the building directory 102 may include graphical logos. The controller 200 analyzes the graphical logos using a feature based geometric techniques, such as scale-invariant feature transform (SIFT) or speeded up robust features (SURF). A descriptor of the graphical logo as determined by SIFT or SURF may be sent to the map developer 101 to query the map database 130 for known logos or for features extracted from previously captured logos.

If the location or logo is identified by the map developer 101, navigation data is provided to the mobile device 100 from the map database 130 of the map developer 101. In one implementation, the mobile device 100 may display step by step directions. In this implementation, position circuitry 207 may be omitted, because the mobile device 101 does not need real time location. Directions from the building directory 102 are used. For example, the display 211 may read:

1. Take elevator bank 2.
2. Go to floor 33.
3. Go through the glass door.
4. Turn left.
5. Destination is third door on the right.

Figure 7A:
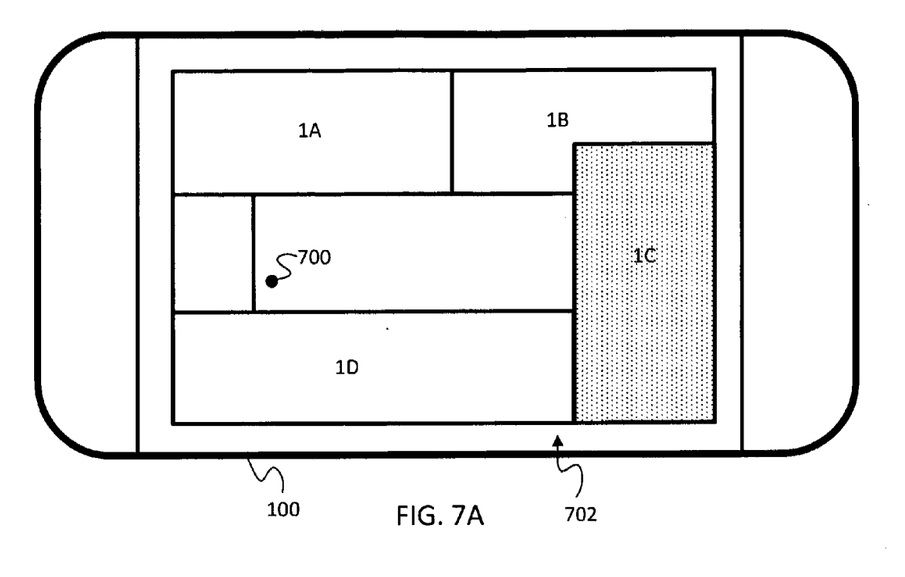
FIG. 7A illustrates a first example of an indoor navigation map.
Figure 7B:
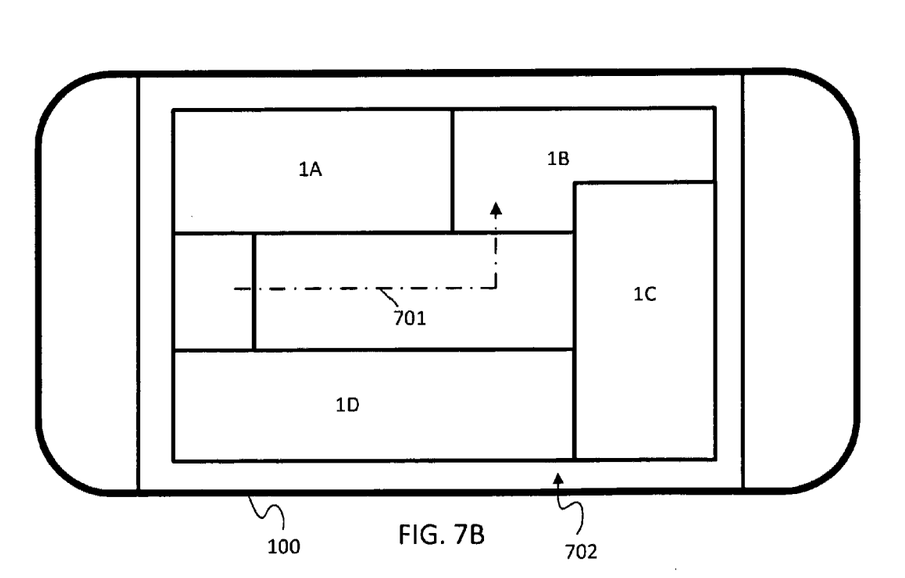
FIG. 7B illustrates a second example of an indoor navigation map.

In another implementation, the mobile device 100 may display an indoor navigation map. FIG. 7A illustrates a first example of an indoor navigation map 702. The indoor navigation map 702 includes a plurality of location names or location indexes. As shown, the mobile device 100 may highlight the destination and the current position 700 of the mobile device 100. FIG. 7B illustrates a second example of an indoor navigation map 702. The mobile device 100 may display the recommended path 701 to the destination. Real-time navigation may or may not be provided in the building for tracking the position of the user in the map.

Figure 8:
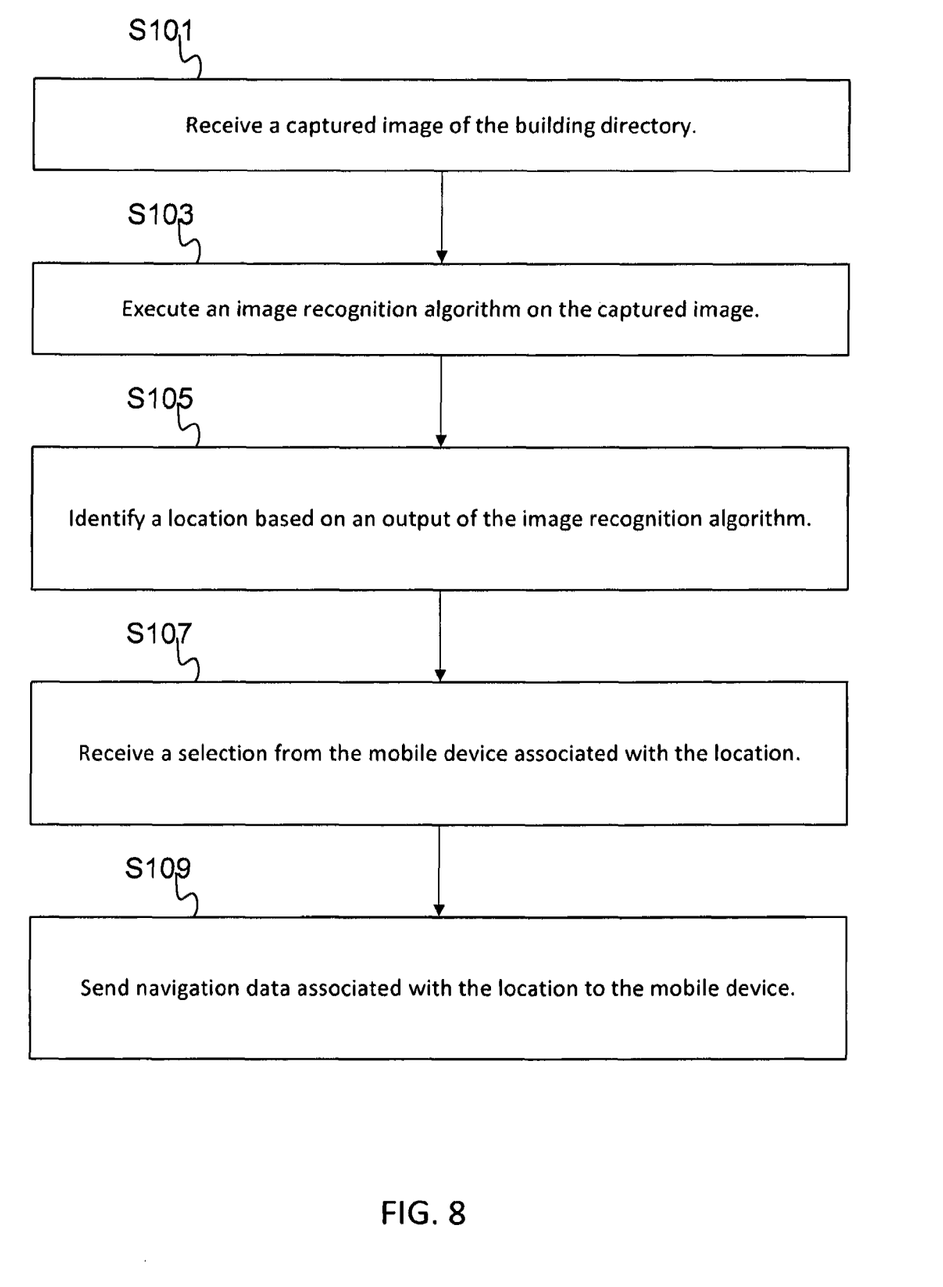
FIG. 8 illustrates an example embodiment of an algorithm for providing navigation data based on building directories.

FIG. 8 illustrates an example embodiment of an algorithm for providing navigation data based on building directories. At S101, the map developer 101 receives a captured image of the building directory 102 from the mobile device 100. The mobile device 100 has captured the image using a viewing application and camera 209. At S103, the processor 300 of the map developer server 120 executes an image recognition algorithm on the captured image. Example image recognition algorithms include but are not limited to OCR, SIFT, and SURF. The image recognition is used to identify the selected information, such as the location index, company name, or logo. The image recognition may identify the location of the hand relative to the directory. At S105, the image recognition algorithm outputs a location associated with the location value displayed on the building directory 102. The user selection of the location is correlated with the directory information. At S107, the map developer 101 receives a selection from the mobile device 101 associated with the location. The selection may be made through input device 203 or through an analysis of captured images.

In the alternative, the bulk of the processing could be performed by the mobile device 100. For example, the controller 200 may perform the image recognition algorithm and/or access a database stored local to the mobile device 100 or accessed directly by the mobile device.

At S109, navigation data is sent to the display 211 of the mobile device 100. The navigation data may be turn by turn directions, a static map showing a route, or an interactive map that updates based on data received from the position circuitry 207. Additional, fewer, or different tasks may be performed by the mobile device 100 and the map developer 101, and any combination may be implemented.

Map Updates

The navigation system 200 may also be configured to update the map database 130 based on the information found in the building directory 102. The map database 130 contains lists of tenants matched with respective location indexes and physical locations. When a tenant moves, a tenant leaves, a new tenant is added, or a floor is reconfigured, the location indexes and physical locations are changed. The mobile device 100 may be leveraged to provide updates to the map database 130. The user decides to capture an image of the building directory 102 through the normal use of an augmented reality application, the use of the navigation services discussed above, or through a request received at the mobile device 100 from the map developer 101.

The camera 209 captures an image of the building directory 102 and the mobile device 100 sends the captured image to the map developer 101. The processor 300 of the map developer 101 executes an image recognition algorithm on the captured image of the building directory 102. The image recognition algorithm outputs location values, which may include pairs of location names 103 and location indexes 104. The processor 300 accesses the map database 130 to locate a database entry that matches one of the location names 103 or location indexes 104. The processor 300 may compare the database entry to determine if any of the location names 103 were previously paired with a different location index. The processor 300 may compare the database entry to determine if any of the location indexes 103 were previously paired with a different location name. The processor 300 may perform one or both comparisons.

If the comparison results in a difference, the processor 300 generates an error report. A variety of error reports may be used. The error report may indicate the degree of matching between the captured image at the database entry. The degree of matching may indicate whether the building directory is a new building directory or has simply been changed. For example, if a percentage of features that match the database entry is above a first threshold, the processor 300 may determine that the building directory has been updated. If the percentage of features that match the database entry is below the first threshold (or a second threshold), the processor 300 may determine that the building directory is a new building directory. Example thresholds include 50% and 90%. The error report may be text-based and may be structured as an email or a short message service (SMS) including sender information associated with the map developer 101. The error report may include extensible markup language (XML) and/or hypertext markup language (HTML). The image of the directory may be included in or with the error report. Alternatively, error correction is provided without a separate or initial report.

Figure 9A:
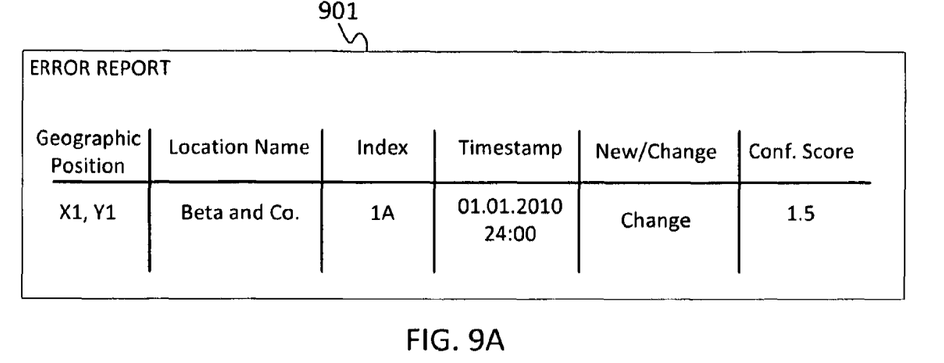
FIG. 9A illustrates a first example of an error report generated by the navigation system of FIG. 3.

FIG. 9A illustrates a first example of an error report 901 generated by the navigation system 200 of FIG. 3. The error report 901 includes one or more of the geographic position of the mobile device 100, the location name, the location index, a timestamp, an indication of the location is a new entry or a changed entry, and a confidence score.

The geographic position of the mobile device 100 may be determined from the last known GPS coordinates of the mobile device 100, through the cellular antenna used to communicate the error report 901, or through an internet protocol (IP) address assigned by a local area network used to communicate the error report 901. Alternatively, a sufficient amount of directory information correlates with a stored directory, indicating the location of the user.

Figure 9B:
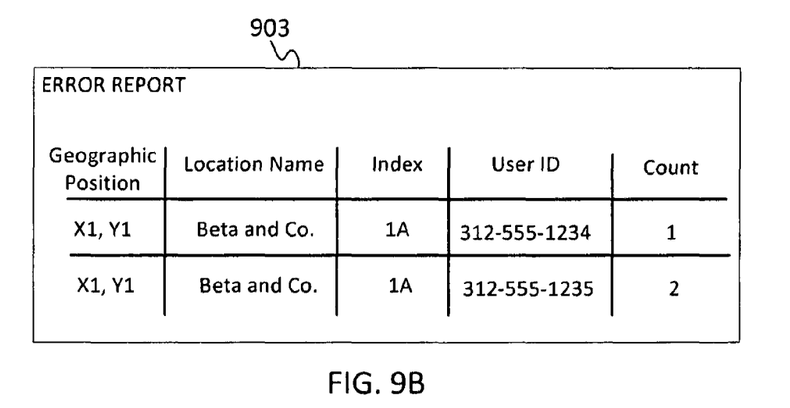
FIG. 9B illustrates a second example of an error report.

The confidence score may be calculated based on the quality of the image or the reliability of the OCR application. Further, the confidence score may be calculated from the number of mobile devices that have captured images resulting in an error report at the particular geographic location during a duration of time. For example, FIG. 9B illustrates a second example of an error report 903 that lists unique users that have transmitted captured images resulting in the same or similar discrepancies in a building directory. The error report 903 may list the geographic position, the location values, a unique user ID (e.g., phone number or media access control (MAC) address), temporal information (such as the times and dates of the users' submissions) and a count of the number of mobile devices 100 that have captured images included building directory changes at that building directory.

Once a predetermined or statistically significant number of mobile devices 100 have captured images used to identify discrepancies (errors) in the building directory 102 within a relatively statistically significant time duration, the map developer 101 may update the map database 130 to reflect the change. The predetermined number may be any number (e.g., 1, 2, 10, and 100) or may be related to the statistically significant duration of time, possibly also taking into account other factors, such as user traffic density. In addition, the map developer 101 may employ a voting system where the number of captured images used to identify discrepancies between the building directory 102 and the map database 130 is compared to the number of captured images that agreed with the map database. The map developer may update the map database when the ratio of the number of errors to the number of matches exceeds a ratio such as 1:2 or 2:1, given a specific number of samples (e.g. 10).

Alternatively, the map developer 101 may dispatch a field agent to visit the building directory 102 to make a firsthand determination of the change and update the map database 130 accordingly. In yet another alternative, the map developer 101 may use an external source such as a phone book, the Internet, or other directory to validate the potential change in the building directory 102.

Figure 9C:
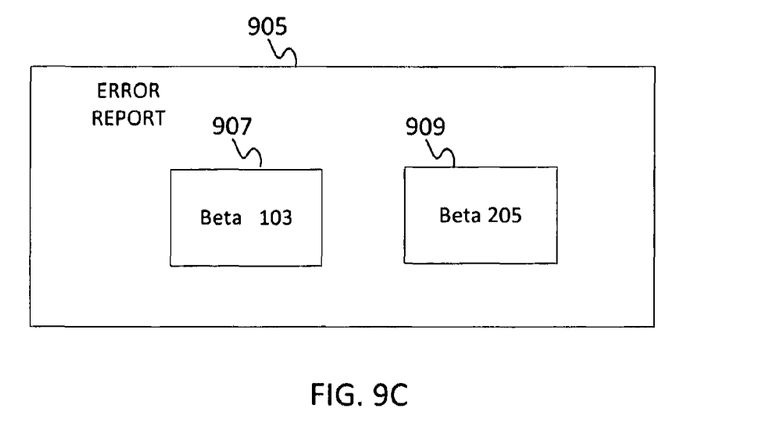
FIG. 9C illustrates a third example of an error report.

FIG. 9C illustrates a third example of an error report 905 generated by the navigation system 200 of FIG. 3. The error report 905 includes a stored image 907 and a captured image 909. The stored image 907 includes location values previously stored in the map database 130. The captured image 909 includes location values currently captured by the mobile device 100. The error report 905 is sent to a crowd sourcing service, such as Mechanical Turk, and an outside entity visually compares the stored image 907 to the captured image 909. The crowd sourcing service may be used for all captured images or for captured images identified as changed by a preliminary image recognition algorithm.

Alternatively, the user of the mobile device 100 may be asked to compare the images. That is, error report 905 may be shown on display 211 and the user will select whether the location values in the captured image 909 differs from that of the stored image 907 using the input device 203.

In one implementation, the map developer 101 may periodically check the accuracy of building directories. To do this, the map developer 101 may identify users who are near a building that is due for update using GPS or other position sensors in the position circuitry 207. The mobile device 100 may display a message asking the user to enter a nearby building to capture an image of the building directory 102. The user may receive an incentive, such as a discount or additional service for assisting in the collection of images. In some circumstances, the user may also be asked to visit the physical location of a new room, capture an image of a room identifier outside of the room, or explore the bounds of a room or walkway. This may be used in the situation where a building or floor has been reconfigured.

The division of processing between the mobile device 100 and the map developer 101 may vary. In one implementation, the map developer 101 provides a substantial portion of the necessary processing power. The mobile device 100 captures image data through camera 209. The mobile device 100 may also determine an estimate of the geographic position using the position circuitry 207. The map developer 101 provides the remaining steps for comparing the captured image and updating the map data. The error report may be provided by the processor 300 and stored in the memory 301 or displayed via the workstation 310.

In a second implementation, the mobile device 100 provides a substantial portion of the necessary processing power. The position circuitry 207 identifies the current geographic position. The communication interface 205 transmits the geographic position to the server 120, which responds with stored data related to the building directory. The controller 200 generates an error report by comparing the stored data with the captured image. The controller 200 may also perform the image recognition algorithm locally.

The display 211 may indicate that the error report was generated and provide the user with a selection of saving the error report, sending the error report to the map developer 101, or deleting the error report. The user makes the selection by way of the input device 203. Alternatively, the user is not prompted or is otherwise unaware of the results or the error report.

Figure 10:
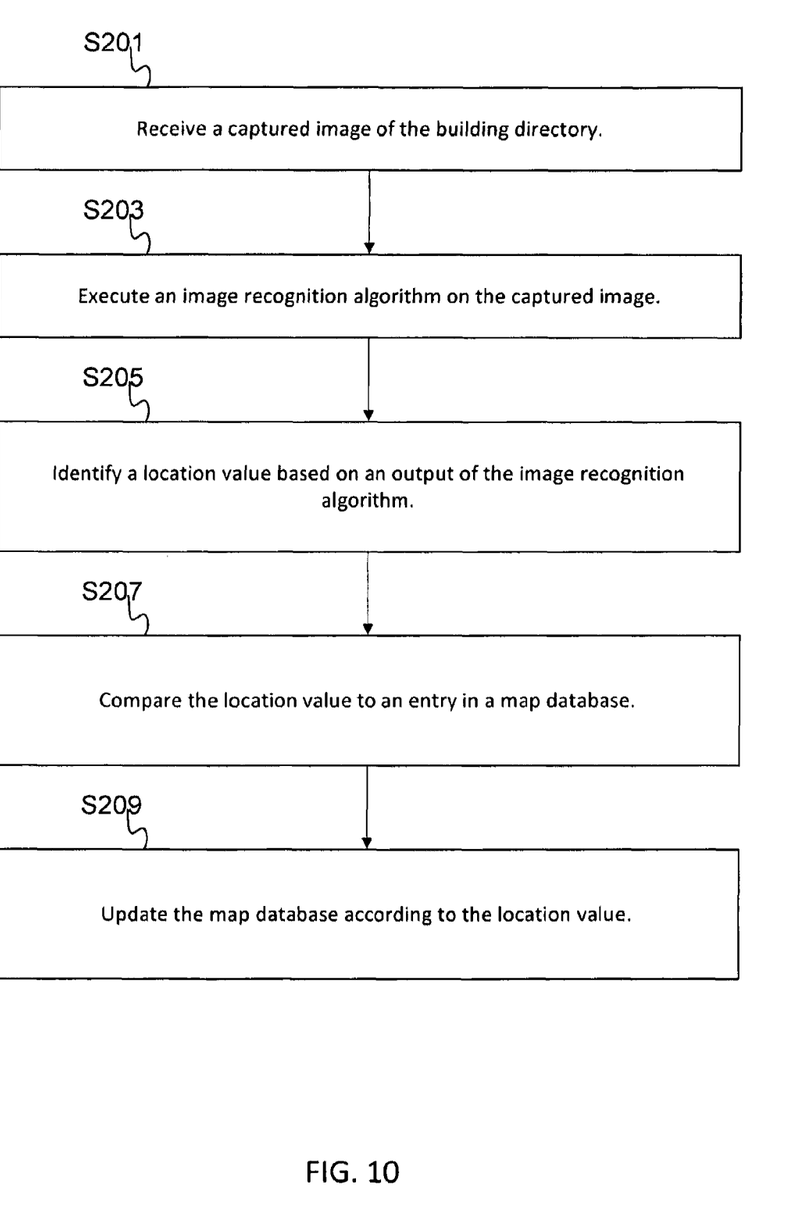
FIG. 10 illustrates an example embodiment of an algorithm for updating geographic data based on building directories.

FIG. 10 illustrates an example embodiment of an algorithm for updating geographic data based on building directories. At S201, the map developer 101 receives a captured image of the building directory 102 from the mobile device 100. At S203, the processor 300 runs an image recognition algorithm on the captured image. At S205, the processor 300 identifies a location value based on an output of the image recognition algorithm. The location value may be a name of a tenant, a suite number, or a graphical representation of the tenant. At S207, the location value is compared to an entry in the map database 130.

Based on the comparison, the processor 300 may generate an error report. The error report may be used to trigger further investigation of the building directory or track future comparison of the building directory with captured images. At S209, the processor 300 updates the map database 130 according to the location value. Alternatively, generation of the error report is omitted and the processor 300 automatically updates the map database 130.

Location Determination

The navigation system 200 may also be used to determine the location of the mobile device 100 based on building directories. Many building have unique combinations of tenants. A building may be identified by the building directory 102 or a combination of the building directory 102 and an estimated geographic position. The estimated geographic position may be a city or a geographic range, such as the service area of a cellular antenna, or a subnet of an IP address.

In one implementation, the captured image of all or part of the building directory 102 may be compared to stored images from memory 301 or database 130. The comparison of the captured image with the stored image may be implemented using 3D to 2D edge matching, a feature based geometric technique, or other techniques. Feature based geometric techniques identify and extract features from one or more fixed views, and match the features to using geometric constraints. Example feature based geometric techniques include SIFT and SURF. The comparison of the captured image and the stored image may be governed by a matching constraint. The matching constraint may define a number of points required to trigger a match, a threshold level between intensities that defines the differing points, or a confidence level of the comparison.

In another implementation, the captured image is processed using OCR and a list of location names is compared to a stored list of names from memory 301 or database 130. In some cases, the name of one tenant may uniquely identify the building. In other cases the name of one tenant and the estimated geographic location may uniquely identify a building.

Alternatively, a match may be determined when a set of location values or a set of location values and the estimated geographic location uniquely identifies a building in the database 130. The set of location values may be a predetermined number of tenant names. The set of location values may be dependent on the entries in the database 130. For example, if three location values from the building directory 102 are identified using the image recognition algorithm and only one entry in the database 130 includes those three location values, then the building has been uniquely identified. In an alternative, the building directory includes an address, building name or other information that may be used to determine the location. The image is processed to extract the information.

Accordingly, the geographic position of the mobile device 100 is determined by processor 300 and sent to the mobile device 100 using the communication interface 305. The mobile device 100 may display the geographic position or use the geographic position in a navigation application, as discussed above.

If the processor 300 is unable to determine a match, the captured image of the building directory 102 may be added to database 130. In one implementation, the map developer 101 may send a list of all of the buildings nearby to the estimated geographic position to the mobile device 100. The user may identify which building should be matched with the captured image by selecting from the list using the input device 203.

Figure 11:
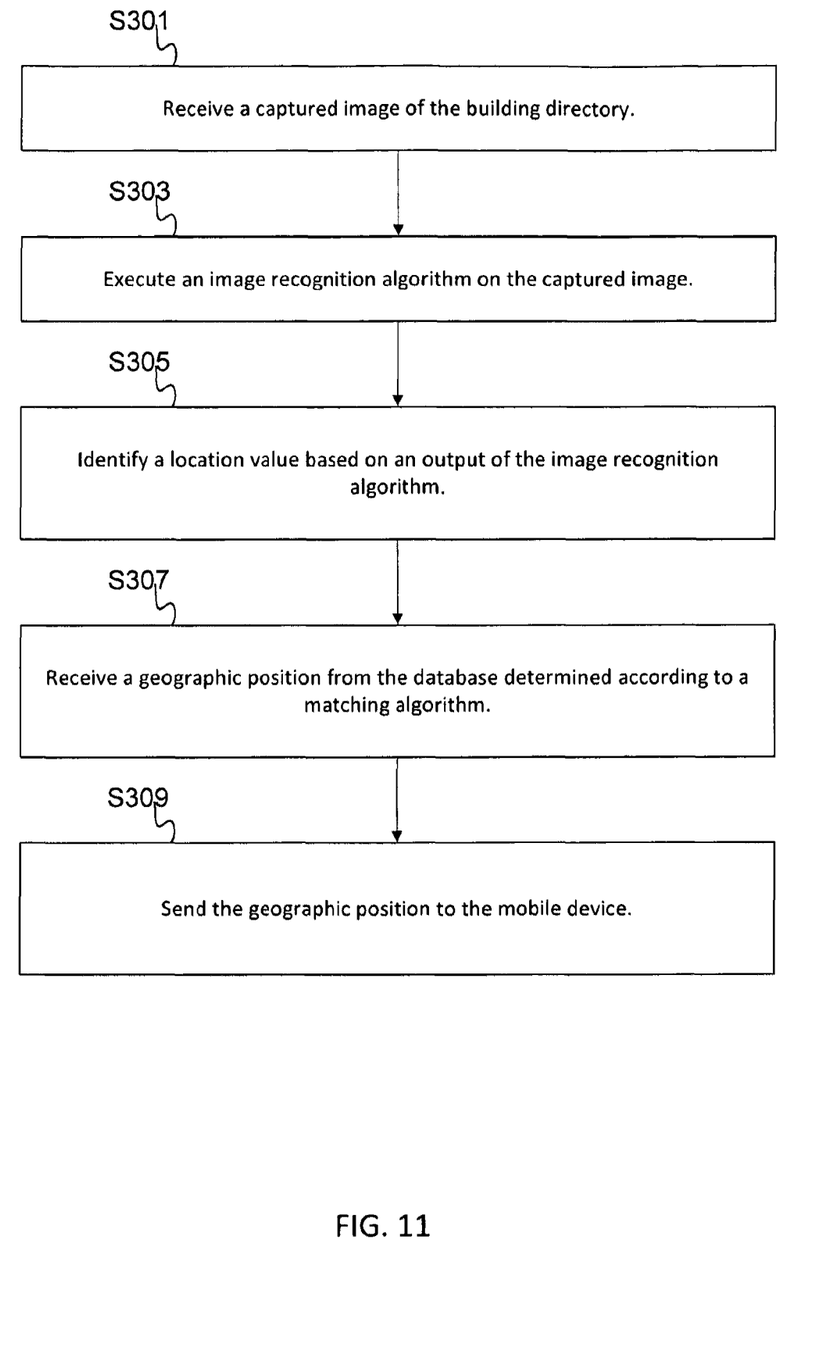
FIG. 11 illustrates an example embodiment of an algorithm for determining a location based on building directories.

FIG. 11 illustrates an example embodiment of an algorithm for determining a location based on building directories. At S301, the map developer 101 receives a captured image of the building directory 102 from the mobile device 100. At S303, the processor 300 executes an image recognition algorithm on the captured image. In the case of text, the image recognition algorithm may be OCR. In the case of logos or the building directory taken as a whole, a feature based geometric technique such as SIFT or SURF may be used.

At S305, the map developer 101 identifies a location value based on an output of the image recognition algorithm. The location value may be an address, building name, tenant name, logo, or the arrangement of the building directory 102. The processor 300 access the map database 130 using the location value. The location value, which may be text or graphics, is fed to a matching algorithm.

At S307, the processor 300 receives a geographic position from the map database 130 determined according to a matching algorithm. In the case of text, the matching algorithm matches the location names with the map database 130. The map database 130 may include sets of location names paired with building names or geographic location. For example, the map database 130 may indicate that the Merchandise Mart Building has the only building directory in Chicago, Ill. that includes both an Arby's and a Baskin-Robbins. If the captured image includes an Arby's and a Baskin-Robbins, the map developer 101 identifies the address or geographic location of the mobile device 100 as the Merchandise Mart Building.

In the case of graphical location values, the map database 130 may include stored images of building directories. The stored images are compared to the captured image of the building directory 102 using a matching algorithm without the need for determine the actual text of the building directory 102. At S309, the map developer 101 sends the geographic position to the mobile device 100. If no match is determined, the map developer 101 may add the captured image to the map database 130 or prompt the mobile device 100 to request the user to take additional photos of the building directory 102.

Additional augmented reality information may be combined with any of the embodiments discussed above. Augmented reality information may be overlaid with the building directory 102 to highlight particular locations. For example, the mobile device 100 may highlight the businesses that the user has been to before, the restaurants matching the user's tastes, or the most common destinations on the building directory 102. The most common destinations in the building directory 102 may be displayed using their relative popularity using a tag cloud.

The mobile device 100 may cross-reference the user's calendar stored in memory 201 to identify when a dentist visit is overdue and highlight the location names of dentists in the building directory 102. The mobile device 100 may identify and highlight the names of contacts from the telephone contact list or from email in the building directory 102. Further, the mobile device 102 may be configured to remove or de-emphasize location names that are closed based on the time of day or day of the week. The phone numbers of tenants may be accessed from the internet and displayed on the mobile device 100 along with the building directory 102.

The embodiments described above may be implemented using computer executable instructions stored in the memory 201 and/or the memory 301, which are non-transitory. The processors may execute computer executable instructions. The computer executable instructions may be written in any computer language, such as C++, C#, Java, Pascal, Visual Basic, Perl, HyperText Markup Language (HTML), JavaScript, assembly language, extensible markup language (XML) and any combination thereof.

The computer executable instructions may be logic encoded in one or more tangible media or one or more non-transitory tangible media for execution by the processors. Logic encoded in one or more tangible media for execution may be defined as instructions that are executable by the processors and that are provided on the computer-readable storage media, memories, or a combination thereof. Instructions for instructing a network device may be stored on any logic. As used herein, "logic", includes but is not limited to hardware, firmware, software in execution on a machine, and/or combinations of each to perform a function(s) or an action(s), and/or to cause a function or action from another logic, method, and/or system. Logic may include, for example, a software controlled microprocessor, an ASIC, an analog circuit, a digital circuit, a programmed logic device, and a memory device containing instructions.

The computer readable instructions may be stored on any non-transitory computer readable medium. A non-transitory computer readable medium may include, but are not limited to, a floppy disk, a hard disk, an ASIC, a compact disk, other optical medium, a random access memory (RAM), a read only memory (ROM), a memory chip or card, a memory stick, and other media from which a computer, a processor or other electronic device can read.

As used herein, the phrases "in communication" and "couple" are defined to mean directly connected to or indirectly connected through one or more intermediate components. Such intermediate components may include both hardware and software based components.

Various embodiments described herein can be used alone or in combination with one another. The foregoing detailed description has described only a few of the many possible implementations of the present invention. For this reason, this detailed description is intended by way of illustration, and not by way of limitation.

We claim:

1. A method of interacting with a building directory using a mobile device, the method comprising:
   receiving a captured image of the building directory including a plurality of location values;
   executing an image recognition algorithm on the captured image of the building directory;
   identifying at least one location value based on an output of the image recognition algorithm; and
   accessing a map database according to the at least one location value, wherein the plurality of location values of the building directory are indoor locations.

2. The method of claim 1, wherein the image of the building directory is captured using an augmented reality application running on the mobile device.

3. The method of claim 1, further comprising:
receiving a selection from the mobile device associated with the at least one location value; and sending navigation data associated with the at least one location value to the mobile device.

4. The method of claim 3, wherein the selection is made by a gesture of a user and the image of the building directory includes the gesture.

5. The method of claim 4, wherein the gesture is tracked and determined as a selection when the gesture is within a range of motion for a predetermined time period.

6. The method of claim 3, wherein the selection is made by a touch screen on the mobile device.

7. The method of claim 1, further comprising:
updating the map database according to the at least one location value.

8. The method of claim 1, further comprising:
performing a comparison of the at least one location value to an entry in the map database; and
generating an error report based on the comparison.

9. The method of claim 8, further comprising:
calculating a confidence score from the image recognition algorithm or from a number of reported errors associated the entry in the map database.

10. The method of claim 8, wherein the error report distinguishes between a new location and a moved location.

11. The method of claim 1, further comprising:
performing a comparison of the at least one location value to an entry in the map database;
identifying a potential error based on the comparison; and
sending the potential error to a crowd sourcing service.

12. The method of claim 1, further comprising:
dispatching a field agent to visit the building directory.

13. The method of claim 1, further comprising:
receiving a geographic position from the database determined according to a matching algorithm; and
sending the geographic position to the mobile device.

14. The method of claim 13, wherein the matching algorithm includes a feature based geometric technique.

15. The method of claim 13, wherein the matching algorithm includes matching a set of location values and an estimated geographic position.

16. The method of claim 1, further comprising:
receiving an indication that no match occurred; and
adding the image of the building directory to the database.

17. A navigation apparatus aided by a building directory comprising:
a memory configured to store a captured image, wherein the captured image includes the building directory having a plurality of location values; and
a processor configured to execute an image recognition algorithm on the captured image of the building directory and access a map database according to at least one location value output from the image recognition algorithm.

18. The navigation apparatus of claim 17, wherein the map database stores navigation data, and the processor selects a subset of the navigation data based on a selection received from a mobile device.

19. The navigation apparatus of claim 17, wherein the processor is configured to update the map database according to the at least one location value.

20. The navigation apparatus of claim 17, wherein the map database stores a geographic location matched to the at least one location value and a communication interface is configured to send the geographic location to a mobile device.

21. A non-transitory computer readable medium configured to store instructions for a method navigation using a building directory, the method comprising:
capturing an image of the building directory including a plurality of location values;
sending the image of the building directory to a map developer for matching with a map database using an image recognition algorithm;
receiving data from the map developer, wherein the data is associated with at least one of the plurality of location values; and
displaying information to a user based on the data.

22. A method of interacting with a building directory using a mobile device, the method comprising:
receiving a captured image of the building directory including a plurality of location values;
executing an image recognition algorithm on the captured image of the building directory;
identifying at least one location value based on an output of the image recognition algorithm; and
providing a navigation-related function to a user of the mobile device related to the at least one location value.

23. The method of claim 22, further comprising: receiving a selection from the mobile device associated with the at least one location value, wherein the navigation-related function is navigation data specifying a route to the at least one location.

24. The method of claim 22, the navigation-related function is a map updated according to matching the at least one location value.

25. The method of claim 22, wherein the navigation-related function is a geographic position of the mobile device determined by a matching algorithm configured to match the at least one location value to a database entry.

26. The method of claim 25, wherein the image recognition algorithm extracts a plurality of features from the captured image and the matching algorithm matches the features to features stored in the database entry.

27. The method of claim 1, wherein the building directory is mounted on a wall.

* * * * *